US011923721B2

(12) United States Patent
Al Dubaikel et al.

(10) Patent No.: US 11,923,721 B2
(45) Date of Patent: Mar. 5, 2024

(54) VOLTAGE REGULATION IN A DC UNINTERRUPTIBLE POWER SUPPLY

(71) Applicant: Saudi Arabian Oil Company, Dhahran (SA)

(72) Inventors: Faisal A. Al Dubaikel, Dhahran (SA); Hossam Abdullah Aldossary, Al-Khobar (SA); Yaseen M. Al Saleh, Al Mubarraz (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 17/688,225

(22) Filed: Mar. 7, 2022

(65) Prior Publication Data

US 2023/0283101 A1 Sep. 7, 2023

(51) Int. Cl.
*H02J 9/06* (2006.01)

(52) U.S. Cl.
CPC .............. *H02J 9/061* (2013.01); *H02J 9/062* (2013.01); *H02J 9/068* (2020.01)

(58) Field of Classification Search
CPC ...... H02J 9/00; H02J 9/06; H02J 9/061; H02J 9/062; H02J 9/068
See application file for complete search history.

(56) References Cited

U.S. PATENT DOCUMENTS

| 4,698,578 A * | 10/1987 | Mullersman | H02J 7/0031 320/136 |
| 5,747,887 A * | 5/1998 | Takanaga | H02J 3/28 307/64 |
| 5,969,504 A * | 10/1999 | Cutchis | H02J 7/36 320/121 |
| 6,049,190 A * | 4/2000 | Canter | H02J 7/35 320/101 |
| 2019/0109471 A1* | 4/2019 | Lee | B60L 58/12 |
| 2020/0389045 A1* | 12/2020 | Chen | H02J 9/066 |
| 2021/0213843 A1* | 7/2021 | Nishio | H02J 9/06 |
| 2021/0376640 A1* | 12/2021 | Lei | H01M 50/204 |

* cited by examiner

*Primary Examiner* — Rexford N Barnie
*Assistant Examiner* — Rasem Mourad
(74) *Attorney, Agent, or Firm* — Fish & Richardson P.C.

(57) ABSTRACT

Disclosed is a system that includes a plurality of battery cells connected in series; a first connection path from an intermediate battery cell of the plurality to an output bus of the system; a second connection path from a last one of the plurality of battery cells to an output bus; a circuit switch installed along the second connection path, the circuit switch configured to open or close the second connection path; and an undervoltage relay in the output bus, wherein the undervoltage relay is set at a threshold voltage, and wherein the undervoltage relay is configured to control the circuit switch when a voltage on the output bus exceeds the threshold voltage or drops below the threshold voltage.

15 Claims, 5 Drawing Sheets

VOLTAGE REGULATION IN A DC UNINTERRUPTIBLE POWER SUPPLY

TECHNICAL FIELD

This disclosure relates to voltage regulation in a direct current uninterruptible power supply.

BACKGROUND

Robust power systems enable supplying power to one or more loads. Such power systems may include combinations of generation, transport, rectification, inversion, and conversion of power to supply energy for electronic, optical, mechanical, and/or nuclear applications and loads. When implementing power systems and architectures, practical considerations include cost, size, reliability, and ease of implementation.

In power systems, direct current uninterruptible power supplies (DC UPSs) can be used to facilitate supplying power to a load. DC UPSs ensure that power is continuously supplied to one or more critical loads, even when one or more components of a power system fail. As such, DC UPSs provide a redundant power source. DC UPSs may be utilized in a number of applications (e.g., utility substations, industrial plants, marine systems, high security systems, hospitals, datacomm and telecomm centers, semiconductor manufacturing sites, nuclear power plants, etc.). DC UPSs may also be utilized in high, medium, or low power applications. For example, DC UPSs may be used in relatively small power systems (e.g., entertainment or consumer systems) or microsystems (e.g., a chip-based system).

As energy consumption outpaces energy supply, power quality, and stability problems may be encountered. Further, energy costs may increase during periods of peak demand. Moreover, at least some renewable energy generation systems (e.g., photovoltaic, wind power) may present additional grid stability problems. Accordingly, to protect sensitive equipment against power quality events (e.g., outages, swells, sags, noise, etc.), DC UPSs are utilized to provide reliability.

SUMMARY

In line with the discussion above, uninterruptible power supplies (DC UPSs) are an important part of backing up systems that include critical loads. This is done mainly through battery banks integrated with the critical loads. However, due to the sensitive nature of the loads typically fed by DC UPSs, the loads require the use of a DC/DC stabilizer, which ensures that a DC UPS's voltage is within an acceptable limit of a load. However, the DC voltage of existing DC UPSs typically varies (and exceeds the load allowable limit). This is due to the requirement that DC UPSs charge their integrated battery banks while also providing power to the load, which requires a higher voltage (which can exceed the voltage limit of the load).

This disclosure describes systems and methods for controlling an output voltage of a direct current uninterruptible power supply (DC UPS) that includes a plurality of battery cells. Among other examples, the systems and methods can be used to control the output voltage in scenarios where the DC UPS feeds a critical load that is sensitive to high battery voltages (e.g., greater than a certain threshold). In one embodiment, a DC UPS includes an intermediate battery tap connection from one of the plurality of battery cells (referred to as an intermediate cell) to a load. The battery tap connection connects the load to a voltage of the intermediate cell. The intermediate cell is selected such that the voltage is acceptable for the load. The DC UPS also includes a second connection to the load. The second connection connects the entire cell bank of the DC UPS to the load. In normal operations, the second connection is open, and thus, the DC UPS provides the output voltage via the intermediate battery tap connection. The DC UPS also includes a relay that closes the second connection in case of failure of the battery power source (e.g., the battery charger). In this scenario, the entire cell bank provides the output voltage to the load. However, because the power source has failed, the output voltage of the entire cell bank is at a value acceptable to the load.

In accordance with one aspect of the present disclosure, a system includes: a plurality of battery cells connected in series; a first connection path from an intermediate battery cell of the plurality to an output bus of the system; a second connection path from a last one of the plurality of cells to an output bus; a circuit switch installed along the second connection path, the circuit switch configured to open or close the second connection path; and an undervoltage relay in the output bus, where the undervoltage relay is set at a threshold voltage, and where the undervoltage relay is configured to control the circuit switch when a voltage on the output bus exceeds the threshold voltage or drops below the threshold voltage.

Other versions include corresponding systems, apparatuses, and computer programs to perform the actions of methods defined by instructions encoded on computer-readable storage devices. These and other versions may optionally include one or more of the following features.

In some implementations, the plurality of battery cells are lead acid batteries.

In some implementations, the plurality of battery cells are 60 battery cells connected in series.

In some implementations, the first connection path includes a blocking diode.

In some implementations, the undervoltage relay is configured to control the circuit switch to close the second connection path when the voltage on the output bus drops below the threshold voltage, and where the undervoltage relay is configured to control the circuit switch to open the second connection path when the voltage on the output bus exceeds the threshold voltage.

In some implementations, the circuit switch is a contactor.

In accordance with another aspect of the present disclosure, a method for configuring an Uninterruptible Power Supply (DC UPS) is disclosed. The method involves: determining an acceptable voltage for a load to be connected to the DC UPS, the DC UPS including a plurality of battery cells; selecting, based on the acceptable voltage, an intermediate battery cell of the plurality to provide power to the load in a first DC UPS mode; connecting a first connection path from the intermediate battery cell to an output bus of the DC UPS; connecting a second connection path from a last battery cell of the plurality to the output bus, the last battery cell of the plurality to provide power to the load in a second DC UPS mode; installing a circuit switch along the second connection path, the circuit switch arranged to open or close the second connection path; installing an undervoltage relay in the output bus; and setting, based on the acceptable voltage, a threshold voltage of the undervoltage relay, where the undervoltage relay is configured to control the circuit switch when a voltage on the output bus exceeds the threshold voltage or drops below the threshold voltage.

Other versions include corresponding systems, apparatuses, and computer programs to perform the actions of methods defined by instructions encoded on computer-readable storage devices. These and other versions may optionally include one or more of the following features.

In some implementations, the plurality of battery cells are lead acid batteries.

In some implementations, the plurality of battery cells are 60 battery cells.

In some implementations, the method further involves: installing a blocking diode along the first connection path.

In some implementations, the undervoltage relay is configured to control the circuit switch to close the second connection path when the voltage on the output bus drops below the threshold voltage, and where the undervoltage relay is configured to control the circuit switch to open the second connection path when the voltage on the output bus exceeds the threshold voltage.

In some implementations, the DC UPS operates in the first mode when the second connection path is open and operates in the second mode when the second connection path is closed.

The subject matter described in this specification can be implemented in particular implementations so as to realize one or more of the following advantages. The disclosed methods and systems provide DC UPSs at a lower cost than existing DC UPSs. The cost savings is in part due to eliminating the need for a DC/DC converter. The disclosed methods and systems also provide control of the output voltage of a DC UPS without any power consumption. Furthermore, the disclosed methods and systems ensure that sensitive loads do not fail due to exceeding the voltage limits of the loads.

The details of one or more embodiments of these systems and methods are set forth in the accompanying drawings and description below. Other features, objects, and advantages of these systems and methods will be apparent from the description, drawings, and claims.

DETAILED DESCRIPTION

This disclosure describes systems and methods for controlling an output voltage of a direct current uninterruptible power supply (DC UPS) that includes a plurality of battery cells. Among other examples, the systems and methods can be used to control the output voltage in scenarios where the DC UPS feeds a critical load that is sensitive to high battery voltages (e.g., greater than a certain threshold). The disclosure is presented to enable any person skilled in the art to make and use the disclosed subject matter in the context of one or more particular implementations. Various modifications to the disclosed implementations will be readily apparent to those skilled in the art, and the general principles defined in this application may be applied to other implementations and applications without departing from scope of the disclosure. Thus, the present disclosure is not intended to be limited to the described or illustrated implementations, but is to be accorded the widest scope consistent with the principles and features disclosed in this application.

In one embodiment, a DC UPS includes an intermediate battery tap connection from one of the plurality of battery cells (referred to as an intermediate cell) to a load. The battery tap connection connects the load to a voltage of the intermediate cell. The intermediate cell is selected such that the voltage is acceptable for the load. The DC UPS also includes a second connection to the load. The second connection connects the entire cell bank of the DC UPS to the load. In normal operations, the second connection is open, and thus, the DC UPS provides the output voltage via the intermediate battery tap connection. The DC UPS also includes a relay that closes the second connection in case of failure of the battery power source (e.g., the battery charger). In this scenario, the entire cell bank provides the output voltage to the load. However, because the power source has failed, the output voltage of the entire cell bank is at a value acceptable to the load.

Figure 1:
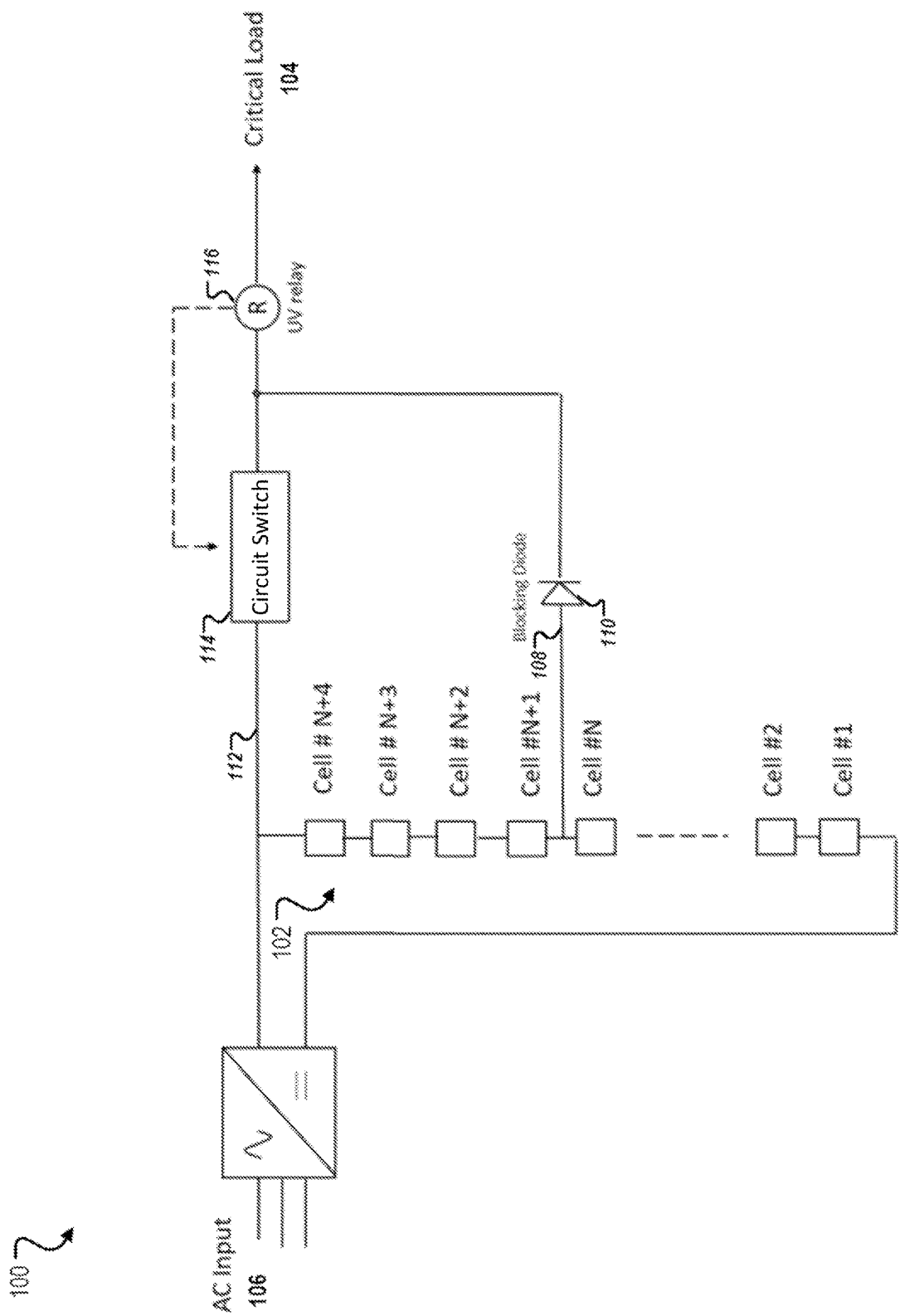
FIG. 1 illustrates a block diagram of an example uninterruptible power supply, according to some implementations of the present disclosure.

FIG. 1 illustrates an example DC UPS system 100, according to some implementations. The DC UPS system 100 can be used to provide power to a load, such as load 104. In some embodiments, the example DC UPS system 100 includes a plurality of battery cells 102. The plurality of battery cells 102 can be, for example, lead acid battery cells. In FIG. 1, the plurality of battery cells 102 are labeled as cell 1 through cell N+4. The plurality of battery cells 102 can be any number of cells. In one example, the plurality of battery cells 102 include 60 battery cells. As shown in FIG. 1, the plurality of battery cells 102 are coupled to an AC input 106, e.g., from a power distribution grid. Under normal operations, the AC input 106 charges or maintains a charge of the plurality of battery cells 102.

In some embodiments, the DC UPS system 100 includes two connections to the load 104. In an example, the first connection is from one of the plurality of battery cells 102 to the load 104. In the example of FIG. 1, the connected battery cell is cell N. As shown in FIG. 1, a connection 108 connects the load 104 from cell N. As also shown in FIG. 1, the connection 108 includes a blocking diode 110. In an example, the second connection to the load 104 is from battery cell N+4 (i.e., the last battery cell in the set).

As shown in FIG. 1, a connection 112 connects the load 104 from cell N+4. The connection 112 includes a circuit switch 114. As shown in FIG. 1, a load bus includes an undervoltage (UV) relay 116 coupled to the connection 112. As described below, the UV relay 116 can control the circuit switch 114. Further, the blocking diode 110 prevents circulating current or backfeed in the DC UPS system 100.

In some embodiments, the connection 112 is open in normal operation. As such, cell 1 through cell N provide power to the load 104 through the connection 108. Specifically, cell 1 through cell N provide either a float voltage (i.e., the voltage at which a battery is maintained after being fully charged) or a boost voltage (i.e., the voltage when the batteries are being charged). In an example, cell N is selected such that both the float voltage and the boost voltage are within an acceptable range for the load 104. This functionality is different from that of legacy systems, which as stated previously, can provide a load with a voltage that exceeds the acceptable range for the load.

In some embodiments, if the AC input 106 fails, the voltage of cell 1 through cell N drops. The drop in voltage triggers the undervoltage relay 116, which is set to be triggered at a voltage lower than the voltage of cell 1 through cell N when the AC input 106 fails. The undervoltage relay 116, in turn, controls the circuit switch 114 to close the connection 112. As a result, the entire cell bank (that is, the plurality of battery cells 102) is connected to the load 104. The undervoltage relay 116 keeps the circuit switch 114 closed until the AC input 106 is reestablished.

Once the AC input 106 is reestablished, the voltage on the output bus will increase and may exceed the tolerance of the load 104. However, rather than feeding the increased voltage to the load 104 (as is done in existing systems), the undervoltage relay 116 is triggered by the increased voltage. In particular, the increased voltage exceeds the configured voltage of the undervoltage relay 116. As a result, the undervoltage relay 116 is triggered, and, in turn, controls the circuit switch 114 to open the connection 112. The DC UPS system 100 once again feeds the load 104 from cell 1 through cell N, which as explained above, is selected such that the output voltage is less than the voltage limit of the load 104. Thus, the DC UPS system 100 can provide power to the load 104 without any interruption and without exceeding the voltage limits of the load 104. The circuit switch 114 can be any circuit switch such as contactors, insulated-gate bipolar transistors, and breakers.

Figure 2:
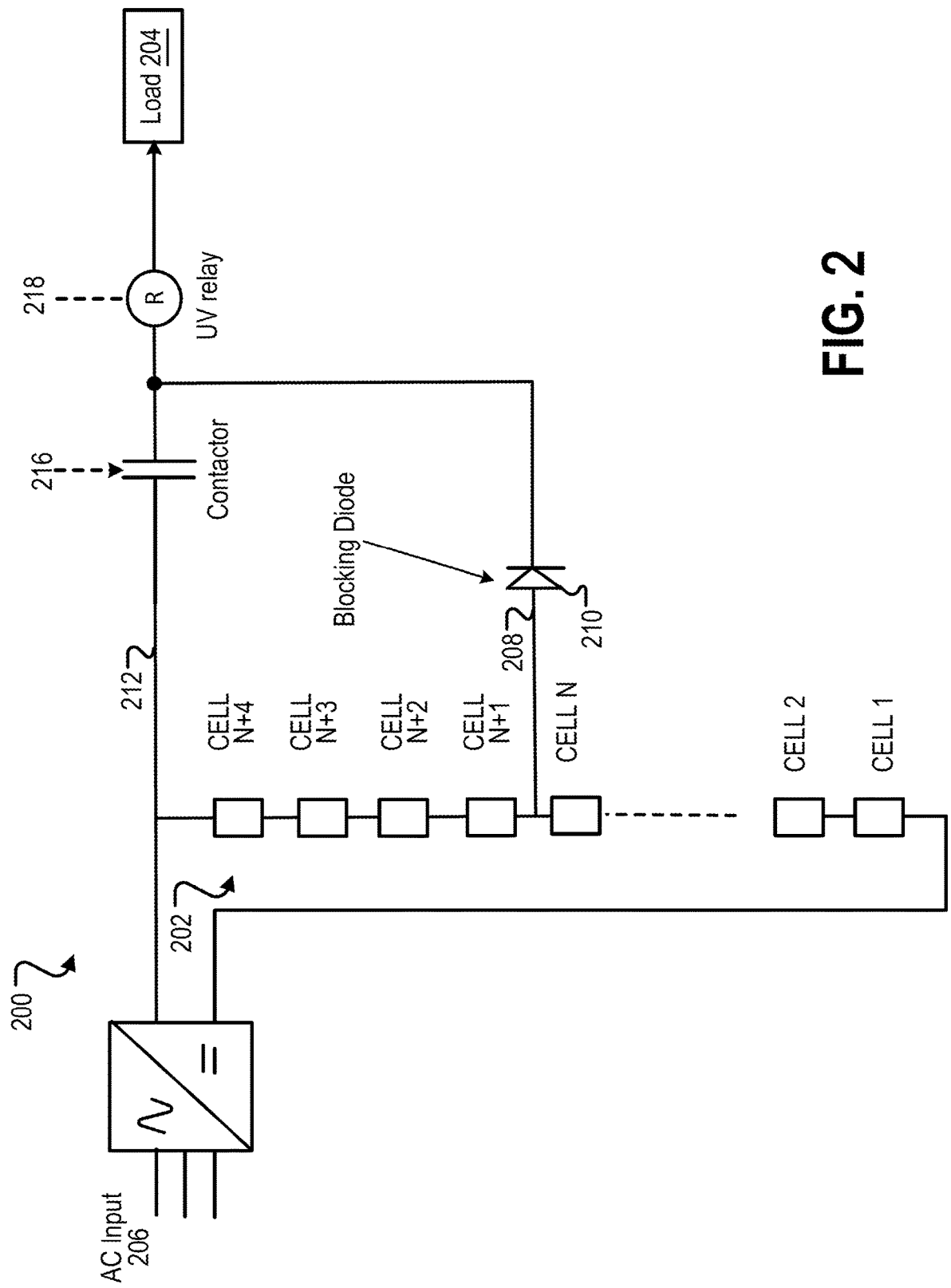
FIG. 2 illustrates a block diagram of another example uninterruptible power supply, according to some implementations of the present disclosure.

FIG. 2 illustrate example DC UPS systems, according to some implementations. The DC UPS system 200 can be used to provide power to a load, such as load 204. In some embodiments, the example DC UPS system 200 includes a plurality of battery cells 202. The plurality of battery cells 202 can be, for example, lead acid battery cells. Additionally, the plurality of battery cells 202 can be any number of cells. In FIG. 2, the plurality of battery cells 202 are labeled as cell 1 through cell N+4. In one example, the plurality of battery cells 202 include 60 battery cells. As shown in FIG. 2, the plurality of battery cells 202 are coupled to an AC input 206, e.g., from a power distribution grid. Under normal operations, the AC input 206 charges or maintains a charge of the plurality of battery cells 202.

In some embodiments, the DC UPS system 200 includes two connections to the load 204. In an example, the first connection is from one of the plurality of battery cells 202 to the load 204. In the example of FIG. 2, the connected battery cell is cell N. As shown in FIG. 2A, a connection 208 connects the load 204 from cell N. As also shown in FIG. 2, the connection 208 includes a blocking diode 210. In an example, the second connection to the load 204 is from battery cell N+4 (i.e., the last battery cell in the set). As shown in FIG. 2, a connection 212 connects the load 204 from cell N+4. As shown in FIG. 2, a load bus includes an undervoltage (UV) relay 218 coupled to the connection 212. The blocking diode 210 prevents circulating current or backfeed in the DC UPS system 200.

As shown in FIG. 2, the DC UPS system 200 includes a contactor 216 as the circuit switch. The UV relay 218 is coupled to the contactor 216. In some embodiments, the connection 212 is open in normal operation. As such, cell 1 through cell N provide power to the load 204 through the connection 208. Specifically, cell 1 through cell N provide either a float voltage (i.e., the voltage at which a battery is maintained after being fully charged) or a boost voltage (i.e., the voltage when the batteries are being charged). In an example, cell N is selected such that both the float voltage and the boost voltage are within an acceptable range for the load 204.

In some embodiments, if the AC input 206 fails, the voltage of cell 1 through cell N drops. The drop in voltage triggers the undervoltage relay 218, which is set to be triggered at a voltage lower than the voltage of cell 1 through cell N when the AC input 206 fails. In the DC UPS system 200, the undervoltage relay 218 controls the contactor 216 to close the connection 212. As a result, the entire cell bank (that is, the plurality of battery cells 202) is connected to the load 204. The undervoltage relay 218 keeps the contactor 216 closed until the AC input 206 is reestablished.

Once the AC input 206 is reestablished, the voltage on the output bus will increase and may exceed the tolerance of the load 204. However, rather than feeding the increased voltage to the load 204 (as is done in existing systems), the undervoltage relay 218 is triggered by the increased voltage. In particular, the increased voltage exceeds the configured voltage of the undervoltage relay 218. As a result, the undervoltage relay 218 is triggered, and, in turn, controls the contactor 216 to open the connection 212. The DC UPS system 200 once again feeds the load 204 from cell 1 through cell N, which as explained above, is selected such that the output voltage is less than the voltage limit of the load 204. Thus, the DC UPS system 200 can provide power to the load 204 without any interruption and without exceeding the voltage limits of the load 204. This functionality is different from that of legacy systems, which as stated previously, can provide a load with a voltage that exceeds the acceptable range for the load, e.g., when an AC input fails.

Figure 3:
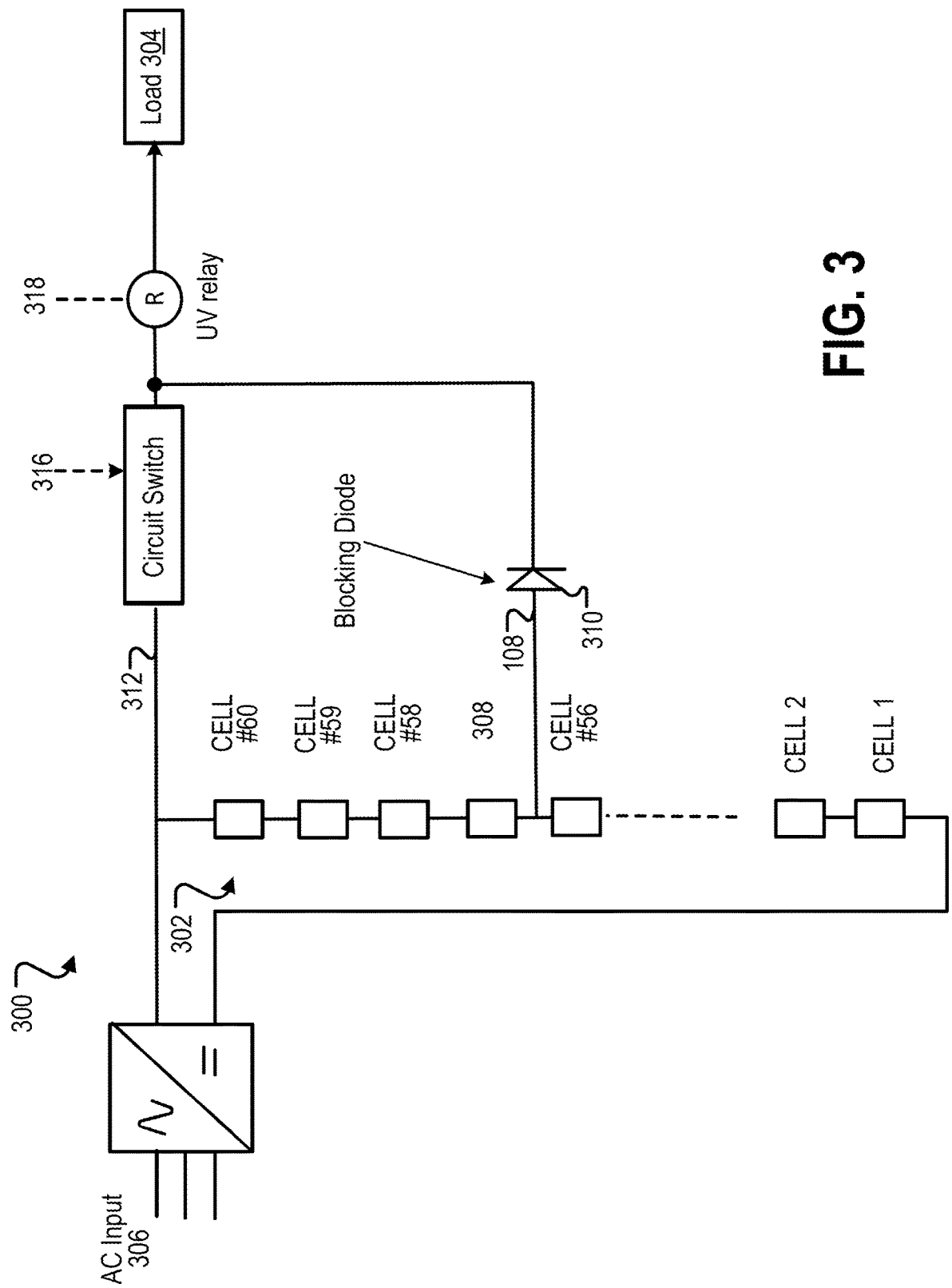
FIG. 3 illustrates a block diagram of another example uninterruptible power supply, according to some implementations of the present disclosure.

FIG. 3 illustrates an example DC UPS system 300, according to some implementations. The example of FIG. 3 provides an illustration of how the disclosed DC UPS systems operate. As shown in FIG. 3, the DC UPS system 300 includes 60 battery cells (e.g., lead acid battery cells). A float voltage of the battery cells is 133.8 Volts DC (VDC) and the voltage without a charger is 120 VDC.

As shown in FIG. 3, the DC UPS system 300 has two connections to a load 304. A first connection 308 is from cell #56 with a blocking diode 310 feeding the load 304. A second connection 312 if from cell #60 feeding the load with a circuit switch 316. Note that the circuit switch 316 can be replaced by a contactor. Further, the load bus includes an undervoltage relay 318 to operate the circuit switch. In this example, the voltage limit of the UV relay 318 is set to 123 VDC.

In normal operation, the power will flow from cell #56 to the load 304. Further, the float voltage will be 2.23 Volts per cell (VPC), thereby providing a float voltage of 124.88 VDC on cell #56. Additionally, the boost voltage is 2.4 VPC, thereby providing a boost voltage of 134.4 VDC on cell #56. Thus, the load 304 will receive either 124.88 VDC in float operation or 134.4 VDC in boost operation. In case of power failure to the charger input (e.g., AC input 306), the 56 cell voltage drops to 112 VDC. As a result, the undervoltage relay 318, which is set to 123 VDC, picks up the drop in voltage. In response, the undervoltage relay 318 operates the circuit switch 316 (or the contactor) in order to close the second connection 312. As a result, the entire cell bank of 60 cell is connected to the load 304 at a voltage of 120 VDC. Since the undervoltage relay 318 is set at 123 VDC, the relay keeps the circuit switch 316 closed until the power comes back. Once the power comes back on, the voltage on the output bus exceeds 123 VDC, which causes the undervoltage relay 318 to open the circuit switch 316 to feed the load 304 from cell #56. The DC UPS system 300 will not cause any power interruption to the load since both cell #56 and cell #60 are connected to the same point with blocking diode.

Furthermore, the DC UPS system 300 provides voltages that are acceptable for critical loads, which typically have an operating window of 100~137 VDC. An existing system with 60 lead acid batteries has a float voltage of the 60 battery cells of 133.8 Volts DC (VDC) and the voltage without a charger is 120 VDC. However, the boost voltage is 2.4 VDC in this DC UPS system, which brings the DC bus voltage to 144 VDC, which will damage the critical load.

Figure 4:
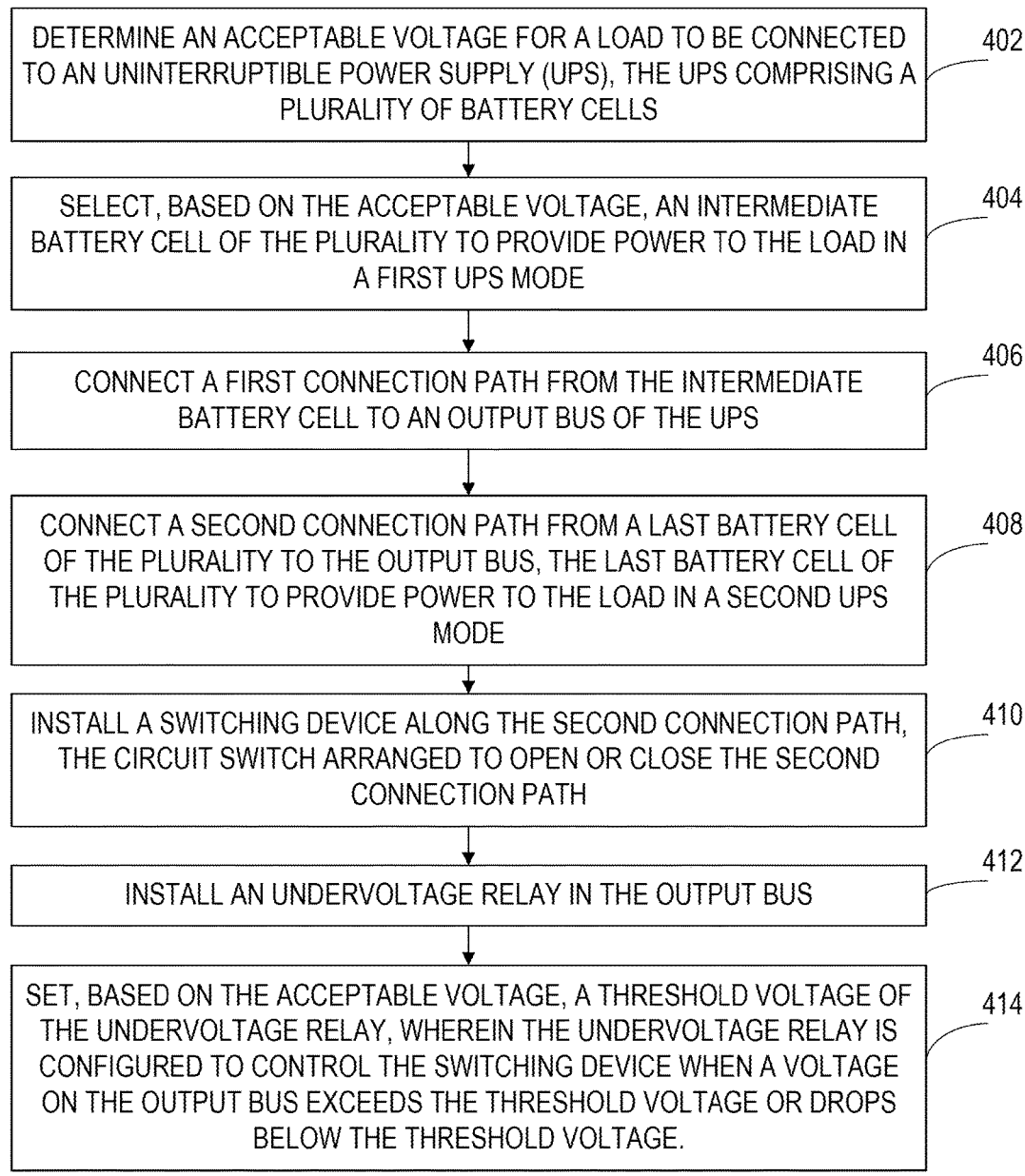
FIG. 4 illustrates a flowchart of an example method, according to some implementations of the present disclosure.

FIG. 4 is a flowchart of an example method 400, according to some implementations. For clarity of presentation, the description that follows generally describes method 400 in the context of the other figures in this description. For example, method 400 can be performed by a computer system described in FIG. 5. In particular, a computer system can control robotic devices to perform method 400. However, it will be understood that method 400 may be performed, for example, by any suitable system, environment, software, and hardware, or a combination of systems, environments, software, and hardware, as appropriate. In some implementations, various steps of method 400 can be run in parallel, in combination, in loops, or in any order.

At step 402, method 400 involves determining an acceptable voltage for a load to be connected to an Uninterruptible Power System (DC UPS), the DC UPS including a plurality of battery cells.

At step 404, method 400 involves selecting, based on the acceptable voltage, an intermediate battery cell of the plurality to provide power to the load in a first DC UPS mode.

At step 406, connecting a first connection path from the intermediate battery cell to an output bus of the DC UPS.

At step 408, method 400 involves connecting a second connection path from a last battery cell of the plurality to the output bus, the last battery cell of the plurality to provide power to the load in a second DC UPS mode.

At step 410, method 400 involves installing a circuit switch along the second connection path, the circuit switch arranged to open or close the second connection path.

At step 412, method 400 involves installing an undervoltage relay in the output bus.

At step 414, method 400 involves setting, based on the acceptable voltage, a threshold voltage of the undervoltage relay, where the undervoltage relay is configured to control the circuit switch when a voltage on the output bus exceeds the threshold voltage or drops below the threshold voltage.

In some implementations, the plurality of battery cells are lead acid batteries.

In some implementations, the plurality of battery cells are 60 battery cells.

In some implementations, the method further involves: installing a blocking diode along the first connection path.

In some implementations, the undervoltage relay is configured to control the circuit switch to close the second connection path when the voltage on the output bus drops below the threshold voltage, and where the undervoltage relay is configured to control the circuit switch to open the second connection path when the voltage on the output bus exceeds the threshold voltage.

In some implementations, the DC UPS operates in the first mode when the second connection path is open and operates in the second mode when the second connection path is closed.

Figure 5:
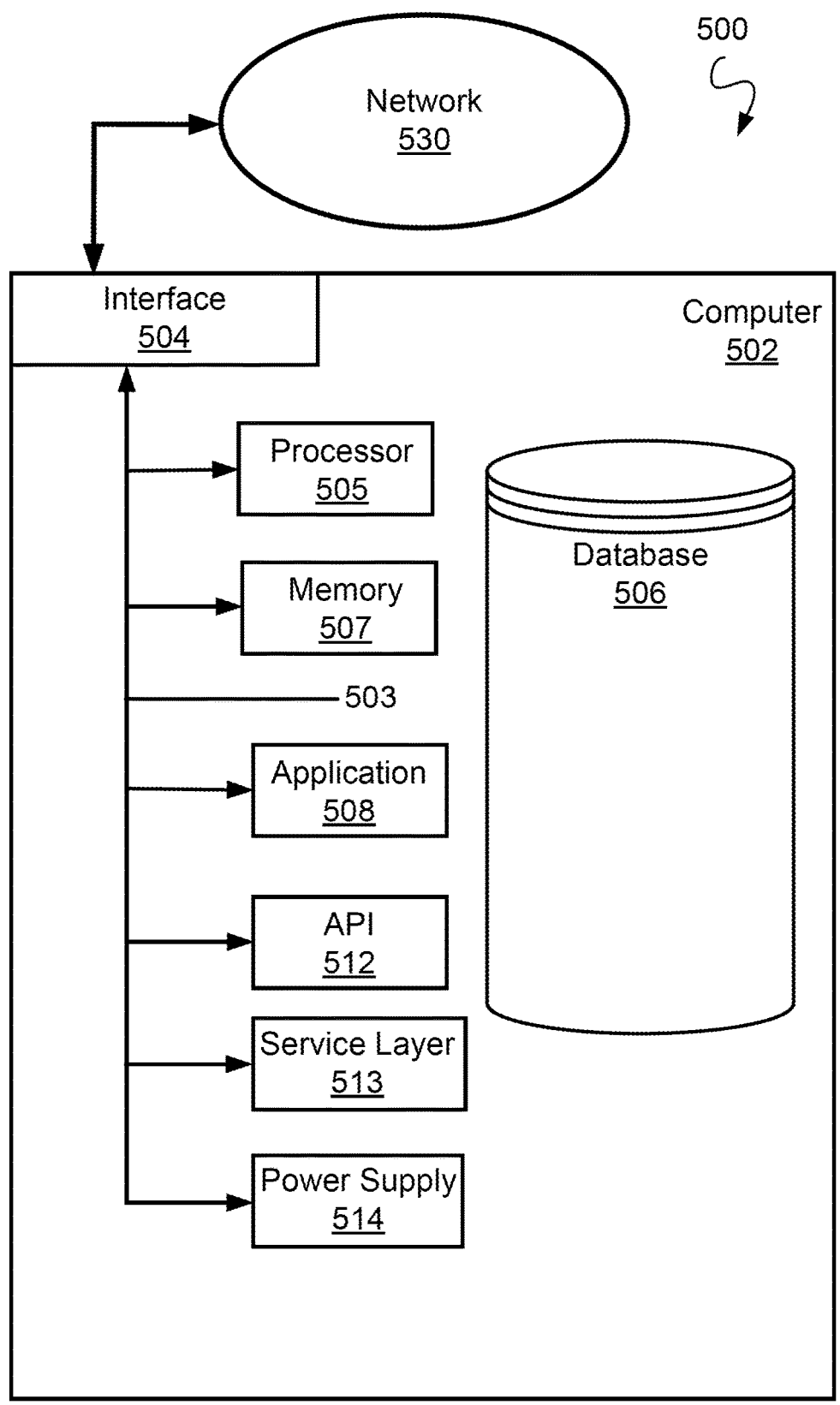
FIG. 5 illustrates a block diagram of an example computer system, according to some implementations of the present disclosure.

FIG. 5 is a block diagram of an example computer system 500 that can be used to provide computational functionalities associated with described algorithms, methods, functions, processes, flows, and procedures, according to some implementations of the present disclosure.

The illustrated computer 502 is intended to encompass any computing device such as a server, a desktop computer, an embedded computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UI) (or GUI). In some implementations, the inputs and outputs include display ports (such as DVI-I+2x display ports), USB 3.0, GbE ports, isolated DI/O, SATA-III (6.0 Gb/s) ports, mPCIe slots, a combination of these, or other ports. In instances of an edge gateway, the computer 502 can include a Smart Embedded Management Agent (SEMA), such as a built-in ADLINK SEMA 2.2, and a video sync technology, such as Quick Sync Video technology supported by ADLINK MSDK+. In some examples, the computer 502 can include the MXE-5400 Series processor-based fanless embedded computer by ADLINK, though the computer 502 can take other forms or include other components.

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a high level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus. In some implementations, any or all of the components of the computer 502, including hardware or software components, can interface with each other or the interface 504 (or a combination of both), over the system bus. Interfaces can use an application programming interface (API) 512, a service layer 513, or a combination of the API 512 and service layer 513. The API 512 can include specifications for routines, data structures, and object classes. The API 512 can be either computer-language independent or dependent. The API 512 can refer to a complete interface, a single function, or a set of APIs 512.

The service layer 513 can provide software services to the computer 502 and other components (whether illustrated or not) that are communicably coupled to the computer 502. The functionality of the computer 502 can be accessible for all service consumers using this service layer 513. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 can include an interface 504. Although illustrated as a single interface 504 in FIG. 5, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 5, two or more processors 505 can be used according to particular needs, desires, or particular implementations of the computer 502 and the described functionality. Generally, the processor 505 can execute instructions and manipulate data to perform the operations of the computer 502, including operations using algorithms, methods, functions, processes, flows, and procedures as described in the present disclosure.

The computer 502 can also include a database 506 that can hold data for the computer 502 and other components connected to the network 530 (whether illustrated or not). For example, database 506 can be an in-memory, conventional, or a database storing data consistent with the present disclosure. In some implementations, the database 506 can be a combination of two or more different database types (for example, hybrid in-memory and conventional databases) according to particular needs, desires, or particular implementations of the computer 502 and the described functionality. Although illustrated as a single database 506 in FIG. 5, two or more databases (of the same, different, or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 (of the same, different, or combination of types) can be used according to particular needs, desires, or particular implementations of the computer 502 and the described functionality. While memory 507 is illustrated as an internal component of the computer 502, in alternative implementations, memory 507 can be external to the computer 502.

An application 508 can be an algorithmic software engine providing functionality according to particular needs, desires, or particular implementations of the computer 502 and the described functionality. For example, an application 508 can serve as one or more components, modules, or applications 508. Multiple applications 508 can be implemented on the computer 502. Each application 508 can be internal or external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion and management circuits, including recharging, standby, and power management functionalities. In some implementations, the power-supply 514 can include a power plug to allow the computer 502 to be plugged into a wall socket or a power source to, for example, power the computer 502 or recharge a rechargeable battery.

There can be any number of computers 502 associated with, or external to, a computer system including computer 502, with each computer 502 communicating over network 530. Further, the terms "client", "user", and other appropriate terminology can be used interchangeably without departing from the scope of the present disclosure. Moreover, the present disclosure contemplates that many users can use one computer 502 and one user can use multiple computers 502.

Implementations of the subject matter and the functional operations described in this specification can be implemented in digital electronic circuitry, in tangibly embodied computer software or firmware; in computer hardware, including the structures disclosed in this specification and their structural equivalents; or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus", "computer", and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, Linux, Unix, Windows, Mac OS, Android, or iOS.

A computer program, which can also be referred to or described as a program, software, a software application, a module, a software module, a script, or code can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document; in a single file dedicated to the program in question; or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes; the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks, optical memory devices, and technologies including, for example, digital video disc (DVD), CD ROM, DVD+/− R, DVD-RAM, DVD-ROM, HD-DVD, and BLURAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), or a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface", or "GUI", can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component such as an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and updat. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, or in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations; and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A system comprising:
an alternating current (AC) input connected to an output bus of the system;
a plurality of battery cells connected in series;
a first connection path from an intermediate battery cell of the plurality of battery cells to the output bus of the system, wherein a subset of the plurality of battery cells includes a first battery cell through the intermediate battery cell;
a second connection path from a last one of the plurality of battery cells to an output bus;
a circuit switch installed along the second connection path, the circuit switch configured to open or close the second connection path; and
an undervoltage relay in the output bus, wherein the undervoltage relay is set at a threshold voltage that is less than a voltage of the first battery cell through the intermediate battery cell of the subset of the plurality of battery cells when the AC input fails, and wherein the undervoltage relay is configured to:
in a first mode of operation, control the circuit switch to open the second connection path when the voltage on the output bus exceeds the threshold voltage so that the subset of the plurality of battery cells provides power to the output bus; and
in a second mode of operation, control the circuit switch to close the second connection path when the voltage on the output bus drops below the threshold voltage so that all of the plurality of battery cells provide power to the output bus.

2. The system of claim 1, wherein the plurality of battery cells are lead acid batteries.

3. The system of claim 1, wherein the plurality of battery cells are 60 battery cells connected in series.

4. The system of claim 1, wherein the first connection path comprises a blocking diode.

5. The system of claim 1, wherein the circuit switch is a contactor.

6. The system of claim 1, wherein the system is a Direct Current Uninterruptible Power Supply (DC UPS).

7. A method for configuring a Direct Current Uninterruptible Power Supply (DC UPS), the DC UPS comprising an alternating current (AC) input, and the method comprising:
  determining an acceptable voltage for a load to be connected to the DC UPS, wherein the DC UPS comprises a plurality of battery cells;
  selecting, based on the acceptable voltage, an intermediate battery cell of the plurality of battery cells, wherein a subset of the plurality of battery cells includes a first battery cell through the intermediate battery cell, and wherein the subset of the plurality of battery cells provides power to the load in a first DC UPS mode;
  connecting a first connection path from the intermediate battery cell to an output bus of the DC UPS;
  connecting a second connection path from a last battery cell of the plurality of battery cells to the output bus, wherein all of the plurality of battery cells provide power to the load in a second DC UPS mode;
  installing a circuit switch along the second connection path, the circuit switch arranged to open or close the second connection path;
  installing an undervoltage relay in the output bus; and
  setting, based on the acceptable voltage, a threshold voltage of the undervoltage relay that is less than a voltage of the first battery cell through the intermediate battery cell of the subset of the plurality of battery cells when the AC input fails, wherein the undervoltage relay is configured to:
    in the first DC UPS mode, control the circuit switch to open the second connection path when the voltage on the output bus exceeds the threshold voltage so that the subset of the plurality of battery cells provides power to the output bus; and
    in the second DC UPS mode, control the circuit switch to close the second connection path when the voltage on the output bus drops below the threshold voltage so that all of the plurality of battery cells provide power to the output bus.

8. The method of claim 7, wherein the plurality of battery cells are lead acid batteries.

9. The method of claim 7, wherein the plurality of battery cells are 60 battery cells.

10. The method of claim 7, further comprising:
  installing a respective blocking diode along the first connection path.

11. One or more non-transitory computer-readable storage media coupled to one or more processors and having instructions stored thereon which, when executed by the one or more processors, cause the one or more processors to perform operations for configuring a Direct Current Uninterruptible Power Supply (DC UPS), the DC UPS comprising an alternating current (AC) input, and the operations comprising:
  determining an acceptable voltage for a load to be connected to the DC UPS, wherein the DC UPS comprises a plurality of battery cells;
  selecting, based on the acceptable voltage, an intermediate battery cell of the plurality of battery cells, wherein a subset of the plurality of battery cells includes a first battery cell through the intermediate battery cell, and wherein the subset of the plurality of battery cells provides power to the load in a first DC UPS mode;
  connecting a first connection path from the intermediate battery cell to an output bus of the DC UPS;
  connecting a second connection path from a last battery cell of the plurality of battery cells to the output bus, wherein all of the plurality of battery cells provide power to the load in a second DC UPS mode;
  installing a circuit switch along the second connection path, the circuit switch arranged to open or close the second connection path;
  installing an undervoltage relay in the output bus; and
  setting, based on the acceptable voltage, a threshold voltage of the undervoltage relay that is less than a voltage of the first battery cell through the intermediate battery cell of the subset of the plurality of battery cells when the AC input fails, wherein the undervoltage relay is configured to:
    in the first DC UPS mode, control the circuit switch to open the second connection path when the voltage on the output bus exceeds the threshold voltage so that the subset of the plurality of battery cells provides power to the output bus; and
    in the second DC UPS mode, control the circuit switch to close the second connection path when the voltage on the output bus drops below the threshold voltage so that all of the plurality of battery cells provide power to the output bus.

12. The one or more non-transitory computer-readable storage media of claim 11, wherein the plurality of battery cells are lead acid batteries.

13. The one or more non-transitory computer-readable storage media of claim 11, wherein the plurality of battery cells are 60 battery cells.

14. The one or more non-transitory computer-readable storage media of claim 11, further comprising:
  installing a blocking diode along the first connection path.

15. The one or more non-transitory computer-readable storage media of claim 11, wherein the circuit switch is a contactor.

* * * * *